United States Patent Office 3,283,018
Patented Nov. 1, 1966

3,283,018
DECOMPOSITION OF AROMATIC FLUOROFORMATES AND FLUOROTHIOFORMATES TO AROMATIC FLUORIDES
Karl O. Christe and Attila E. Pavlath, Berkeley, Calif., assignors to Stauffer Chemical Company, New York, N.Y., a corporation of Delaware
No Drawing. Filed May 7, 1965, Ser. No. 454,215
6 Claims. (Cl. 260—650)

This application is a continuation-in part of our copending application Serial No. 300,666 filed August 7, 1963, now abandoned. This invention relates to a new and novel method for preparing fluorine containing aromatic compounds. In particular, it refers to a new process for preparing nuclear fluorinated aromatic compounds, both mono- and poly-fluoro, as well as monocycle and polycyclic.

Introduction of fluorine into an aromatic ring according to the prior art has been both difficult and expensive. In general, aromatic fluorine compounds have been prepared by substituting fluorine for other atoms in the corresponding aromatic starting material or by the synthesis from fluorinated aliphatic compounds. The replacement of primary amino groups was the first route used to prepare aromatic fluorine compounds and it is still today the most widely used method. There have been many attempts at improving yields and ease of reaction. The most notable is the investigation of the decomposition of the diazonium fluoroborate by Schiemann and Balz (Ber., 60B, 1186 (1927)). Although the method of Schiemann and Balz is more satisfactory than earlier methods, it suffers from a number of limitations. One is the availability of some amines, unreactivity, or in some cases the starting material is unstable.

Direct fluorination of the aromatic compound has been attempted. However, the high reactivity of elementary fluorine and its derivatives, such as the halogen fluorides, has been a deterring factor in the method of direct fluorination. Addition of elementary fluorine to an aromatic ring is possible if an inert diluent, as nitrogen, is used to modify the extremely exothermic reaction. The resulting compounds are saturated and must be dehalogenated or dehydrohalogenated to arrive once again to an aromatic system. The extent of fluorination and product composition is very difficult to control.

The method of formation from highly fluorinated aliphatic compounds was begun because of the great difficulty in preparing highly fluorinated aromatic compounds by previous methods. The preparation of fluoroaromatics using small aliphatic units at high temperatures (500–600° C.) produces many side products making it, therefore, an unfavorable industrial method. The use of fluoroacetylinic compounds appears more desirable. The chief difficulty in this latter method is the preparation of the starting material.

The class of fluorinated aromatic compounds are known. Often they serve as intermediates for the preparation of other classes of materials. Fluoroaromatic compounds find use in agricultural chemicals, in dyestuffs, and in pharmacology. Their growth in these fields has been limited by economics and lack of availability of the fluoroaromatic intermediates.

It is, therefore, a general object of the present invention to provide a new process for preparing nuclear fluorinated aromatic compounds, both mono- and poly-fluoro, and both monocyclic and polycyclic.

A more specific object is provision of a process for preparing said nuclear fluorinated aromatic compounds which excludes the use of elementary fluorine, or the synthesis from fluorinated aliphatic or acetylinic units.

Pursuant to the above mentioned and yet further objects, it has been found that nuclear fluorinated aromatic compounds can be conveniently prepared by the thermal decomposition of the corresponding arylfluoroformate or fluorothiolformate at 350° to 900° C. The corresponding arylfluoroformate and fluorothiolformate can be prepared by the process as described in our copending applications Serial No. 300,657 filed on August 7, 1963, which utilizes carbonyl chlorofluoride and the corresponding hydroxy or thiol containing aromatic compound, and Serial No. 300,638 filed on August 7, 1963, which uses the corresponding arylchloroformate or arylchlorothiolformate and a metal fluoride.

The thermal decomposition of arylfluoroformates and arylfluorothiolformates is conducted under substantially anhydrous conditions in a continuous flow process. In the process, the aromatic fluoroformate or fluorothiolformate is passed through a heated reaction chamber. The reaction chamber may be packed with a catalyst. The reaction chamber is preferably made of material resistant to chemical attack at elevated temperatures; for example, nickel, stainless steel, platinum or quartz was found acceptable.

In this invention no packing is necessary to effect reaction, although in order to increase the conversion and yield to more acceptable values the use of a surface active catalyst is desirable. Any material of high surface area may be used as a catalyst. The catalyst material preferably should not react with the reactants at the temperature of the decomposition. Such catalysts as silver wool, silver plated copper wool, charcoal, quartz granules and the like are acceptable for the present process. The preferred catalyst, however, is platinum gauze.

Using the above mentioned catalysts, the reaction can be carried out from about 350° C. and above depending on the thermal stability of the corresponding arylfluoroformate or arylfluorothiolformate. The preferred range is 600–850° C., when, for example, platinum gauze is used as a catalyst.

Any retention time of arylfluoroformate or arylfluorothiolformate in the reaction zone will lead to production of the corresponding fluorinated aromatic compound. The most useful range of retention time depends on the temperature and catalyst used. A retention time of 2–30 seconds of the reactants in the heated tube for the preferred temperature range and catalyst gave the most favorable results.

In the practice of the invention the arylfluoroformate or arylfluorothiolformate is placed in a container adjoining the reactor tube and heated. An inert gas, such as nitrogen, is used as a carrier to transport the reactant through the tube. The use of an inert carrier is helpful as a diluent in the formation of the desired fluorinated aromatic by suppressing the formation of unwanted diarylcarbonates and diaryldithiolcarbonates as well as other possible diradical combinations.

The thermal decomposition of o-phenylene-bis-fluoroformate to prepare o-difluorobenzene cannot be achieved satisfactorily in one step. This is due to the favored intramolecular carbonate formation. Therefore the introduction of two fluorine atoms in ortho position must be introduced in a multistep procedure.

The composition of the products will vary with the arylfluoroformate or arylfluorothiolformate used. Generally, there are small amounts of tar and decomposition products, corresponding arenols or arenthiols, and major amounts of fluorinated aromatic compounds. Since all the possible products are boiling above room temperature, conventional methods of distillation and purification can be used to obtain a commercial product.

The following examples serves to illustrate the present invention.

Examples 1–8

A tube of quartz glass was charged with the various catalysts listed in Table I. The packed tube was placed in a tube furnace 30 cm. long and heated to the indicated temperatures for the various examples in Table I. The temperature was measured with an external thermocouple. A flask containing the quantity of phenylfluoroformate to be thermally decomposed was joined to the reactor tube and heated to 100–200° C. so as to produce sufficient vapor pressure. An inert gas, such as nitrogen, was used as a carrier gas and was passed through the heated phenylfluoroformate. The retention time was regulated by the nitrogen flow.

A series of cold traps were adjoined to the reactor tube exit to quench and collect the products. The conversion of starting material and yield was determined from a representative sample by gas-liquid partition chromatography. The samples were further fractionated by preparative gas phase chromatography and then identified by infrared and nuclear magnetic resonance analysis.

This method can be either a batch or continuous process, wherein the unreacted arylfluoroformate may be recycled through the heated reactor. In the continuous process the total conversion can be greatly increased with a high yield of fluorobenzene and very little by-products.

TABLE I.—HIGH TEMPERATURE PYROLYSIS OF PHENYLFLUOROFORMATE

| Example | Catalyst | Reaction Temperature (° C) | Retention time, Sec. | Conversion of $\phi OCOF$ (percent) | Yield (percent) | | |
|---|---|---|---|---|---|---|---|
| | | | | | $\phi F$ | $\phi O$ | Other |
| 1 | AlF₃ on Asbestos | 650 | 3–4 | 100 | 2.0 | ¹ 98 | |
| 2 | Pt+Ag plated Cu-wool | 370–500 | 3–4 | 1.0 | 50 | ² 50 | |
| 3 | Pt+Ag plated Cu-wool | 800 | 2–3 | 65 | 16.4 | ² 83.6 | |
| 4 | Charcoal | 750 | 2 | 99.9 | 1.44 | 41.8 | 56.7 |
| 5 | Quartz granules | 750 | 1–2 | 65.5 | 31.2 | 20.8 | 48.0 |
| 6 | Pt gauze | 600 | 5 | 4.5 | 41.0 | 59.0 | |
| 7 | Pt gauze | 750 | 3–4 | 72.1 | 90.1 | 9.8 | trace |
| 8 | Pt gauze | 800 | 2–3 | 99.5 | 70 | 3.5 | 26.5 |

¹ Tar and phenol.
² Higher boiling compounds.

Example 9

This example illustrates the thermal decomposition of phenylfluorothiolformate to produce fluorobenzene. This was done in order to show that not only phenylfluoroformate but compounds of the general type aryl-X-COF, wherein X is S or O, can be decomposed to give fluorobenzene.

The reaction conditions and reactor were similar to those used in Examples 1–8. The quartz tube was charged with platinum gauze catalyst and heated to various temperatures between 400° and 850° C. The best results were obtained at 780° C. with a retention time of 1–2 seconds. Nitrogen gas was used as a carrier for the phenylfluorothiolformate.

The exit gases from the reactor were quenched and collected in cold traps at −78° C. (Dry Ice-acetone) and liquid nitrogen temperature. The products were analyzed by gas-liquid partition chromatography and by infrared and nuclear magnetic resonance. The conversion of phenylfluorothiolformate was 99.9%. The yields and products obtained were fluorobenzene 78.7%, benzene 6.0%, thiophenol 3.8%, and tar and decomposition products 11.5%. In addition, $CS_2$ was produced in the above described reaction according to the formula

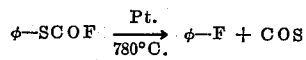

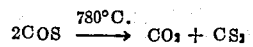

Examples 10–16

The following examples given in Table II illustrate the applicability of the present invention to mono nuclear substituted aromatic monofluoroformates. The same genera procedure of the previous examples was used here. The decompositions were carried out using a quartz tube with platinum gauze filling.

The products were analyzed by gas chromatography and nuclear magnetic resonance after separation by preparative gas chromatography.

TABLE II.—THERMAL DECOMPOSITION OF MONONUCLEAR SUBSTITUTED AROMATIC MONOFLUOROFORMATES

| Ex. | Substitution in X-$\phi$-OCOF | Temperature (° C.) | Retention time (sec.) | Percent conversion of starting material | Percent yield |
|---|---|---|---|---|---|
| 10 | p-Bromo- | 750 | 2–3 | 76.0 | 50.9 p-bromofluorobenzene. |
| 11 | p-Chloro- | 750 | 2–3 | 85.1 | 41.2 p-chlorofluorobenzene. |
| 12 | p-Fluoro- | 730 | 3 | 88.3 | 37.7 p-difluorobenzene. |
| 13 | p-Trifluoromethyl- | 660 | 6–8 | 12.3 | 42.6 p-trifluoromethyl-fluorobenzene. |
| 14 | p-Methyl- | 750 | 3 | 96.1 | 33.8 p-fluorotoluene. |
| 15 | o-Fluoro- | 790 | 1–2 | 77.9 | 35.1 o-difluorobenzene. |
| 16 | o-Bromo- | 780 | 1–2 | 68.4 | 29.4 o-bromofluorobenzene. |

Examples 17–18

Using the procedure of the previous examples, the thermal decomposition of meta- and para-phenylene-bis-fluoroformates was conducted. At 700° C. with a retention time of 5–6 seconds, 51% of the m-phenylene-bis-fluoroformate was converted to 14.5% m-difluorobenzene. Also in the reaction 75.5% m-fluorophenylfluoroformate was produced. This latter compound could be recycled in order to effect further conversion to m-difluorobenzene.

With p-phenyl-bis-fluoroformate at 700° C. and 5–6 seconds' retention time, 20.7% of the starting material was converted to yield 9.2% p-difluorobenzene. There was obtained 90.8% p-fluorophenylfluoroformate. This material as well as the starting material could be recycled, so as to produce more of the desired p-difluorobenzene. The products were identified in the usual manner.

Example 19

Using the reactor and procedure of the previous reactions, the thermal decomposition of 1-naphthylfluoroformate was carried out. The temperature of the platinum gauze filled quartz tube was 680° C. A retention time of 6–8 seconds was used. A 44.4% conversion of starting material was obtained. The products as analyzed by vapor phase chromatography consisted of 25.2% 1-fluoronaphthalene, a trace of naphthalene and the remainder was not identified. After collection of a sample by preparative gas chromatography, the 1-fluoronaphthalene was further identified by $F^{19}$ and proton nuclear magnetic resonance.

Various changes and modifications may be made in the process described herein as will be apparent to those skilled in the chemical arts. It is accordingly intended that the present invention shall only be limited by the scope of the appended claims.

We claim:

1. A process for producing substituted aromatic compounds selected from the group consisting of phenyl and naphthyl compounds and having at least one fluorine atom bonded directly to an aromatic carbon atom and having further substituents selected from the group consisting of hydrogen, fluorine, chlorine, bromine, methyl and trifluoromethyl; comprising the thermal decomposition of said substituted aromatic compounds having at least one substituent selected from the group consisting of fluoroformyl (—OCOF) and fluorothioformyl (—SCOF), the only other substituents being selected from the group consisting of hydrogen, fluorine, chlorine, bromine, methyl and trifluoromethyl, at temperatures between 350° C. and 900° C. to convert said fluoroformyl and fluorothioformyl group to form the corresponding fluoro-substituted aromatic compound.

2. A process for producing substituted aromatic compounds selected from the group consisting of phenyl and naphthyl compounds and having at least one fluorine atom bonded directly to an aromatic carbon atom and having further substituents selected from the group consisting of hydrogen, fluorine, chlorine, bromine, methyl and trifluoromethyl; comprising the thermal decomposition of said substituted aromatic compounds having at least one substituent selected from the group consisting of fluoroformyl (—OCOF) and fluorothioformyl (—SCOF), the only other substituents being selected from the group consisting of hydrogen, fluorine, chlorine, bromine, methyl and trifluoromethyl, in the presence of a platinum catalyst at temperatures between 600° C. and 850° C. for 2 to 30 seconds retention time to convert said fluoroformyl and fluorothioformyl groups to form the corresponding fluoro-substituted aromatic compound.

3. The process for producing fluorobenzene comprising the thermal decomposition of phenyl fluoroformate at a temperature range of about 350° to 90° C.

4. The process for producing fluorobenzene comprising the thermal decomposition of phenyl fluoroformate in the presence of platinum at a temperature range of about 600° C. to 850° C. for a contact time of about 2 to 30 seconds.

5. The process for producing fluorobenzene comprising the thermal decomposition of phenyl fluorothioformate at a temperature range of about 350° C. to 900° C.

6. The process for producing fluorobenzene comprising the thermal decomposition of phenyl fluorothioformate in the presence of platinum at a temperature range of about 600° C. to 850° C. for a contact time of about 2 to 30 seconds.

References Cited by the Examiner

Makanishi et al., "J. Amer. Chem. Soc.," vol. 77, pp. 3099–3100 (1955).

LEON ZITVER, *Primary Examiner.*

K. V. ROCKEY, *Assistant Examiner.*